(12) United States Patent
Maerkle

(10) Patent No.: US 7,748,717 B2
(45) Date of Patent: Jul. 6, 2010

(54) HOUSING PART FOR A DRIVE UNIT, AS WELL AS METHOD AND MOLD FOR MANUFACTURING SAME

(75) Inventor: Jens Maerkle, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 835 days.

(21) Appl. No.: 10/593,371

(22) PCT Filed: Jun. 14, 2005

(86) PCT No.: PCT/EP2005/052738

§ 371 (c)(1),
(2), (4) Date: Sep. 20, 2006

(87) PCT Pub. No.: WO2006/000535

PCT Pub. Date: Jan. 5, 2006

(65) Prior Publication Data

US 2007/0193765 A1    Aug. 23, 2007

(30) Foreign Application Priority Data

Jun. 29, 2004 (DE) ................. 10 2004 031 314

(51) Int. Cl.
*F16J 15/02* (2006.01)
*B60J 5/04* (2006.01)
*H01R 13/64* (2006.01)

(52) U.S. Cl. .................. 277/637; 439/248; 49/502

(58) Field of Classification Search .................. 277/551, 277/570, 573, 628, 637; 49/502; 439/297, 439/248

See application file for complete search history.

(56) References Cited

U.S. PATENT DOCUMENTS

| 4,575,578 | A | * | 3/1986 | Bogan et al. ................. 174/358 |
| 4,697,864 | A | * | 10/1987 | Hayes et al. ................. 439/444 |
| 5,257,949 | A | * | 11/1993 | Paulus ..................... 439/620.1 |
| 6,026,852 | A | * | 2/2000 | Barton et al. ........... 137/512.15 |
| 6,702,593 | B2 | * | 3/2004 | Ogawa ........................ 439/79 |
| 2001/0022050 | A1 | | 9/2001 | Bentz et al. |
| 2002/0053800 | A1 | | 5/2002 | Seifert et al. |

FOREIGN PATENT DOCUMENTS

| DE | 200 04 338 | 8/2001 |
| EP | 1 044 780 | 10/2000 |
| JP | 08047943 | 2/1996 |

* cited by examiner

*Primary Examiner*—Vishal Patel
(74) *Attorney, Agent, or Firm*—Michael J. Striker

(57) ABSTRACT

A housing part (10) for a drive unit, as well as a method and mold for manufacturing such a housing part, which housing part (10) is composed of a first component (11) and has a radial seal (28) formed onto it composed of a second, elastic component (60), which has a radial sealing surface (40) for sealing a housing in in a watertight fashion; the housing part (10) and radial seal (28) are produced by means of an injection molding process; at least one riser dome (36) is formed onto the radial seal (28) and extends from the radial sealing surface (40) in the axial direction (12).

6 Claims, 3 Drawing Sheets

HOUSING PART FOR A DRIVE UNIT, AS WELL AS METHOD AND MOLD FOR MANUFACTURING SAME

PRIOR ART

The present invention relates to a housing part for a drive unit as well as a method and injection mold for manufacturing such a housing part, as generically defined by the preambles to the independent claims.

There are many known drive units in which the housing is comprised of various housing parts that are sealed in relation to one another in a watertight fashion for uses in humid environments. For example, DE 200 04 338 U1 has disclosed a power window drive unit in which an insert module can be inserted into a corresponding opening of a transmission housing. In this instance, the insert module represents a housing part that has a cover surface for the opening in the transmission housing, with a plug connector formed onto it. A radial seal with a plurality of sealing lips is formed onto the inside of the housing part and seals the transmission housing upon insertion into an approximately rectangular shaft. Such radial seals are usually injection molded onto the housing part as a result of which, so-called fusion seams and gating points are often situated within the radial sealing surface. Such irregularities in the sealing surface negatively affect the tightness of the housing of such drive units.

ADVANTAGES

The housing part according to the present invention as well as the method and the injection mold for manufacturing such a housing part, with the defining characteristics of the independent claims, have the advantage that by forming a so-called riser dome in the axial extension to the radial sealing surface of a radial seal that is injection molded onto the housing part, this radial seal does not have any fusion seams. After the second elastic component is injected into the mold of the radial seal, the region inside the riser dome in which the two flow fronts meet and form a fusion seam rises upward so that the radial sealing surface is characterized by a very homogeneous material distribution. The region of the riser domes has no sealing action so that irregularities or voids that occur in the riser domes do not negatively affect the tightness of the housing. As a result, the injection molding process is less critical in the manufacture of seals so that larger fluctuations in the production process are acceptable.

Advantageous modifications of the housing part according to the present invention and its manufacturing process are possible by means of the defining characteristics embodied in the dependent claims. If the riser domes are situated, for example, so that their outer radial wall does not come into contact with the corresponding radial sealing surface of the housing over the entire axial assembly path of the housing part, then the riser domes do not negatively influence the sealing action of the radial sealing surface.

In conventionally injection-molded radial seals, the two partially cooled flow fronts form a fusion seam that results in a radial unevenness in the sealing surface, thus reducing the sealing action. Providing riser domes can prevent the formation of a fusion seam in the radial sealing surface.

Since the surface quality is particularly important in sealing surfaces that are long and straight, the particularly homogeneous surface of the radial sealing surface allows the radial seal to also be used to seal an approximately rectangular opening in the housing.

In a preferred embodiment, the radial seal has precisely one gating point that is not situated in the region of the circumferential radial seal, but is instead preferably situated radially inside it. This also prevents irregularities in the sealing surface caused by gating points situated directly on the radial seal.

It is particularly advantageous, starting from a gating point inside the radial seal, to supply the elastic material via two symmetrical connecting pieces of the radial seal mold. If these connecting pieces are situated, for example, approximately in the middle of the long sides of the rectangular radial seal, then the riser domes are situated in a particularly advantageous fashion approximately in the middle of the two short sides of the rectangular seal. This embodiment assures that neither the gating points nor fusion seams produce irregularities in the radial sealing surface.

In another exemplary embodiment, the housing part has additional axial play compensation elements that are preferably injection molded integrally onto the radial seal. As a result, the housing part with the radial seal can also be reliably attached to the housing in the axial direction by means of detent elements that engage with corresponding counterpart elements of the housing. Eliminating separate fasteners between the housing part and the housing permits the assembly process to be automated.

The housing part with the radial seal can be manufactured in a particularly favorable manner by means of a two-component plastic injection molding process in which first, the housing part is injection molded, for example, out of hard plastic. An insert part reserves the volume for the second elastic component, for example an elastomer. After removal of the insert part, then in a second step, the material of the radial seal is injected into the same injection mold; the material spreads out via a centrally located injection nozzle and via connecting pieces into the mold of the radial seal and then fills the volume of the riser domes. In an alternative two-component injection molding process, the two components are injected into two different nests of a mold; in this instance, the housing part is transferred from one nest into the other nest. Such easy-to-control two-component injection molding processes can be used to inexpensively mold a very uniform radial sealing surface onto the housing part.

During the injection molding process, if a pressure sensor, color sensor, or some other sensor is connected to the ends of the riser domes, then during the injection molding process, it is possible to very effectively check whether the second elastic component has reliably filled the entire volume of the radial seal. To that end, the injection process must be continued until all of the riser dome sensors indicate that the riser domes have been filled with the elastic material.

In the injection mold according to the present invention, in order to execute the injection molding process according to the present invention, the riser domes can be embodied simply in the form of an axial extension leading from the radial seal. Likewise, the injection opening with the connecting pieces to the radial seal can be advantageously embodied in the form of a one-piece insert part or in the form of a second nest in the injection mold. This eliminates the need for the injection mold to have complex gate valves.

It is particularly advantageous for the parting line of the mold to be situated in a diagonal of the essentially rectangular radial seal. As a result, any material irregularities due to the parting location of the injection mold occur at the corners of the radial seal. This has the advantage that, due to the form of the rounded corners, an increased material pressure occurs at these points, with increased sealing forces (compared to the straight segments), which compensate for possible slight irregularities due to the parting line.

DRAWINGS

An exemplary embodiment of the present invention is shown in the drawings and will be explained in detail in the description that follows.

DESCRIPTION OF THE EXEMPLARY EMBODIMENT

Figure 1:
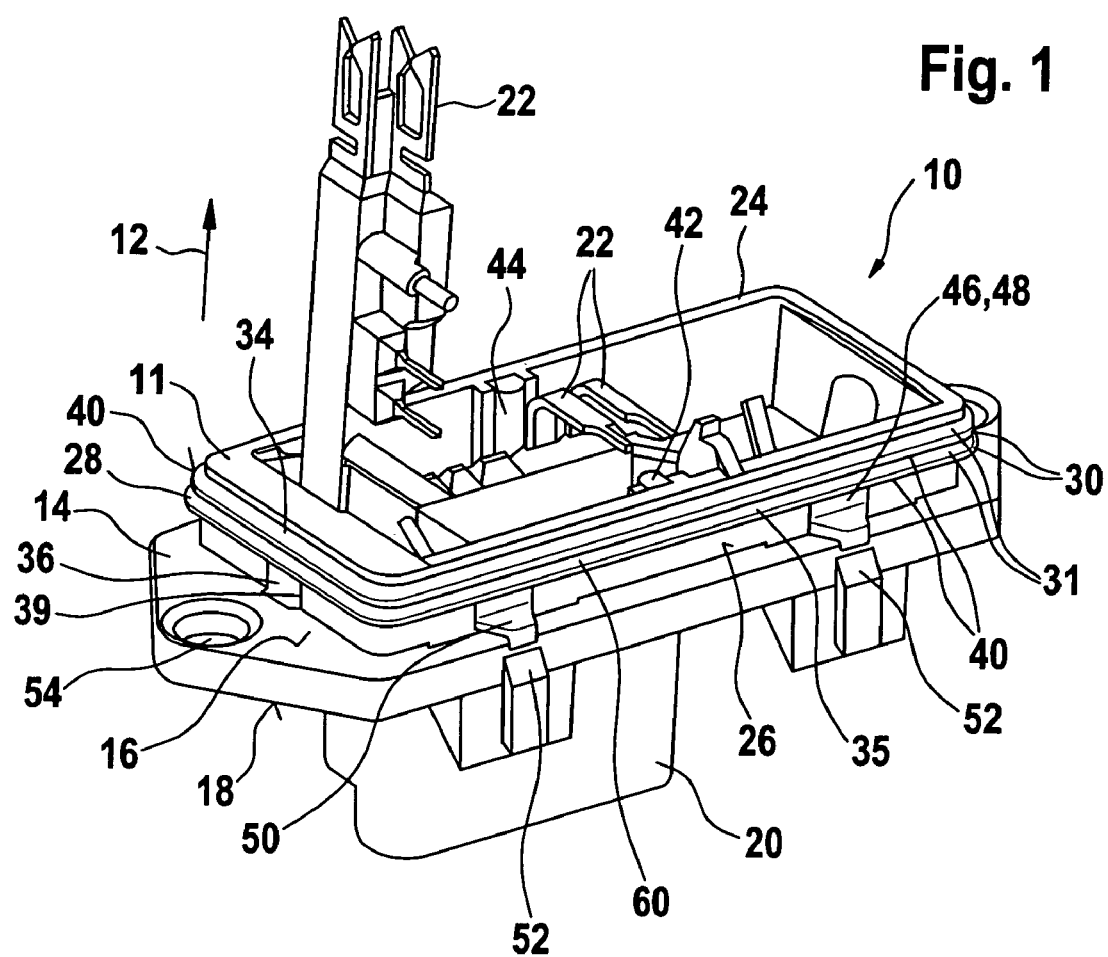
FIG. 1 shows a perspective view of a housing part.
Figure 2:
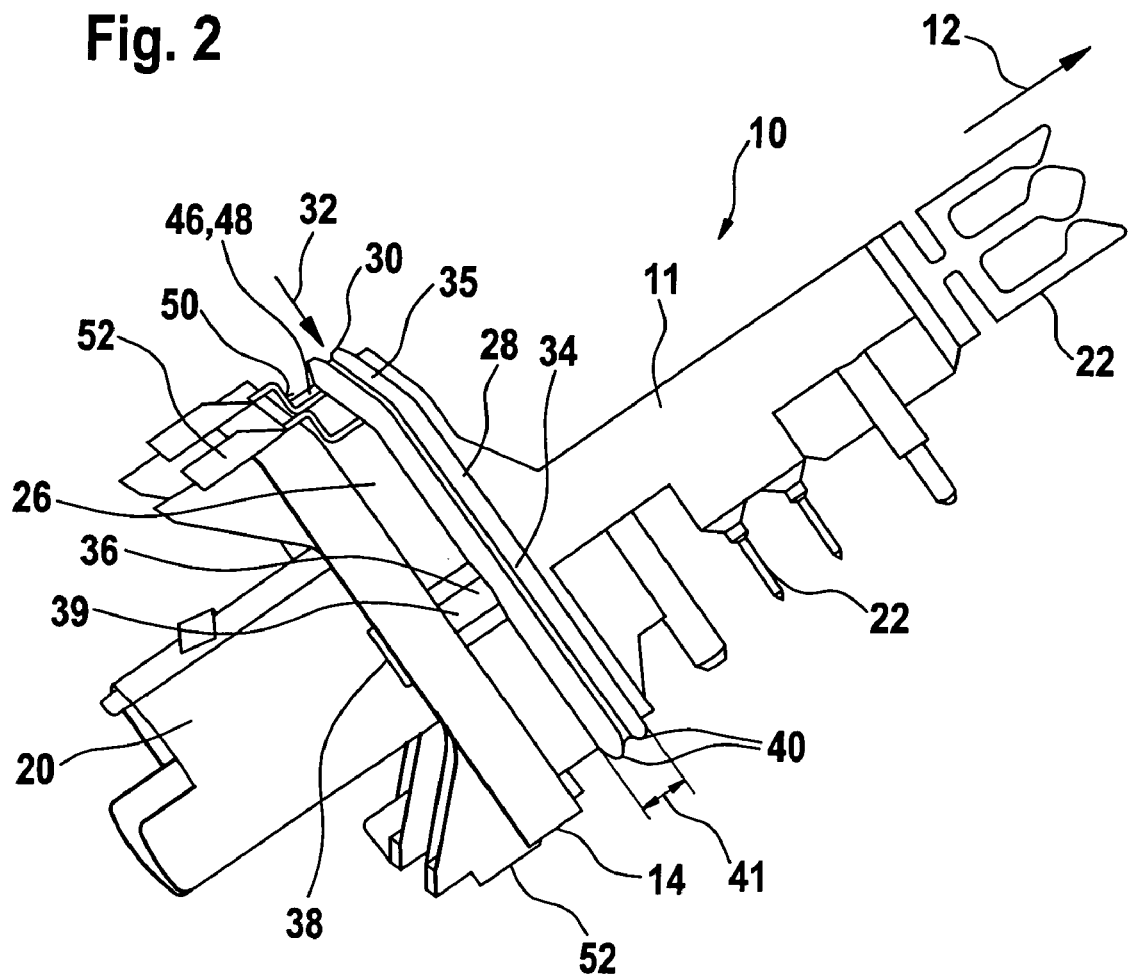
FIG. 2 shows another depiction of the same housing part.

FIG. 1 shows a housing part 10, which is suitable for sealing a transmission and/or electronics housing of a drive unit in a watertight fashion. The housing of the drive unit, which is not shown in detail, has, for example, an approximately rectangular opening with a radial side wall into which the housing part 10 is inserted in the axial direction 12 to seal the housing shut. The housing part 10 has a cover element 14 with an inside 16 and an outside 18. For example, the outside 18 has a plug connector 20 formed onto it and electrical contacts 22 are routed through the cover element 14 to the inside 16. The inside 16 of the cover element 14 has a circumferential wall 24 formed onto it, with a radial outer surface 26 onto which a circumferential radial seal 28 is molded. The radial seal 28 is approximately rectangular, with rounded radii 30 at the corners in order to seal a corresponding rectangular opening in the housing. For example, the radial seal 28 has two or more sealing lips 31 that constitute a radial sealing surface 40 with an axial span 41. Radial forces 32 (perpendicular to the axial direction 12), which occur during insertion into the housing, press and elastically deform the radial seal 28 against a radial wall of the housing. A riser dome 36, which protrudes away from the radial seal 28 in the axial direction 12, is situated approximately in the middle of each of the short sides 34 of the radial seal 28. In the exemplary embodiment, the riser dome 36 extends through the cover element 14 and on the outside 18, constitutes an axial end 38, as depicted in FIG. 2. In order not to influence the sealing action of the radial seal 28, the riser domes 36 are radially offset in relation to the radial sealing surface 40. In the exemplary embodiment, for example, an outer radial wall 39 of the riser dome 36 is situated inside the radial sealing surface 40. Inside the radial seal 28, a gating point 42 is also provided, which is connected to the radial seal 28 via connecting pieces 44. Since both the riser domes 36 and the gating point 42 are not situated in the region of the radial sealing surface 40, the latter is particularly homogeneous and has no fusion seam or injection molding disturbances. In addition to the riser domes 36, the radial seals 28 have additional axial protrusions 46 formed onto them, which function as axial play compensation elements 48. The play compensation elements 48 rest against the inside 16 of the cover element 14 on one side and on the opposite side, they provide an axial stop surface 50 for the housing. The shape and dimensions of the play compensation elements 48 can be used to generate a spring force that is required for a detent connection 52 between the housing part 10 and the housing. For this purpose, detent projections 52 are provided on the housing part 10, for example, which engage in corresponding detent tabs of the housing that are not shown in detail. As an alternative to the detent elements 52, the housing part 10 can also be attached by means of separate fasteners; to this end, openings 54 for separate fasteners such as screws or rivets are provided on the housing part 10.

It is clearly evident from FIG. 2 that the axial protrusions 46 of the play compensation elements 48, like the riser domes 36, are radially offset from the radial sealing surface 40 so that they do not touch the axial walls of the housing during axial insertion of the housing part 10 into the housing. The axial play compensation elements 48 are situated in the region of detent elements 52, which, in an alternative embodiment, can also be embodied in the form of detent eyelets that can be engaged by the corresponding detent hooks of the housing.

The housing part 10 is manufactured by means of a two-component injection molding process; in a first step, a base body is injection molded out of a first component 11, for example a hard plastic. During this first injection molding procedure, an insert that has the shape for the second component 60 is placed in the mold. After removal of the insert, in a second step, the second component 60 is injected into the injection mold at the gating point 42; an elastic material, preferably an elastomer or a thermoplastic, is used as the second component 60. In an alternative injection molding process, the two components are injected into two different nests of a mold; in this instance, the housing part 10 is transferred from one nest into the other.

Figure 3:
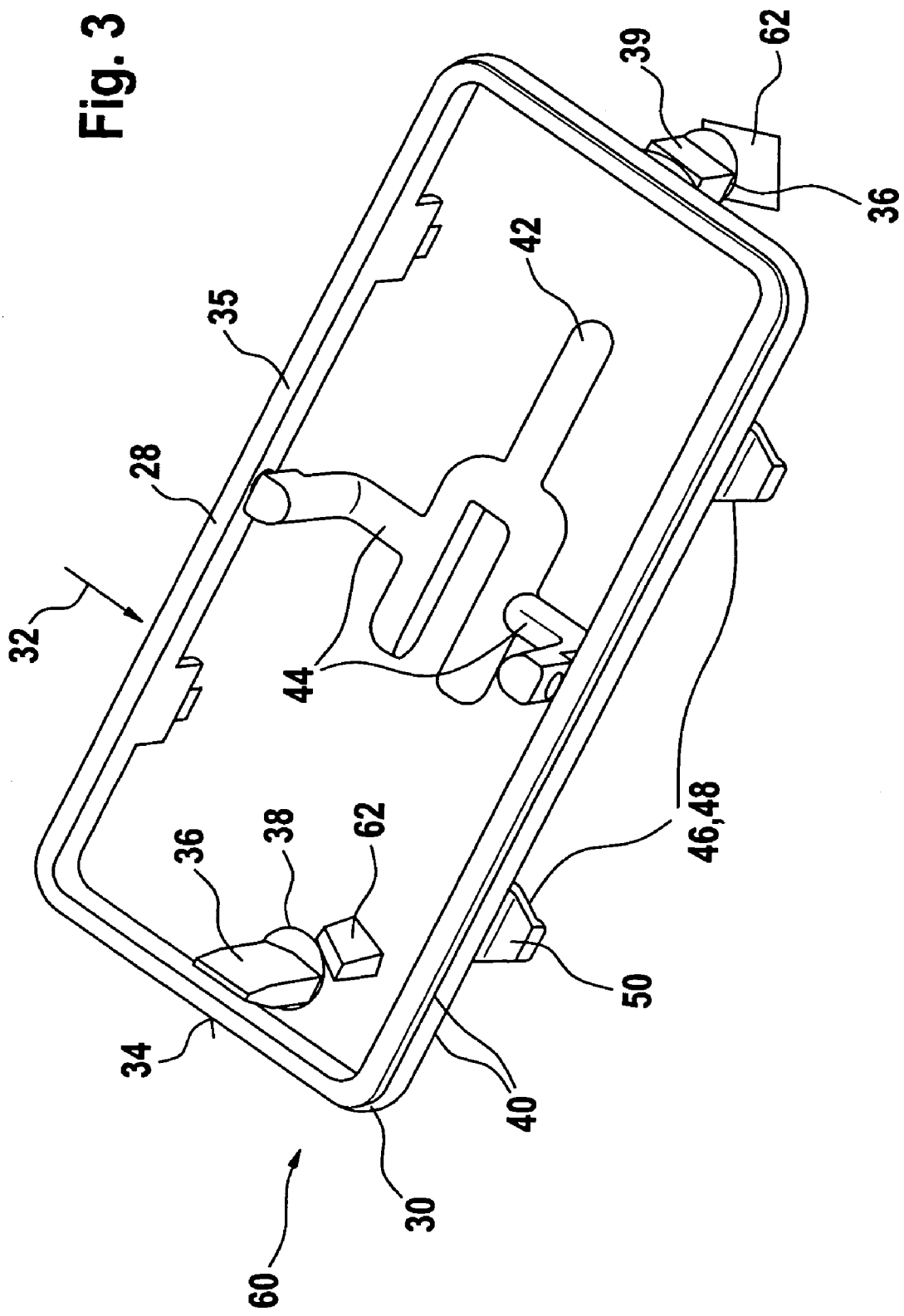
FIG. 3 shows the second component of the same housing part, which constitutes the radial seal.

FIG. 3 shows the second, elastic component 60 without the first component 11 in order to illustrate the injection molding process. Starting from the gating point 42, the second component 60 flows into the form of the radial seal 28 via symmetrically situated connecting pieces 44 approximately in the middle of the long sides 35. When the second component 60 flows, partially cooled flow fronts form, which meet in the middle region of the short sides 34 and flow into the riser domes 36. As a result, the fusion seam between the flow fronts is situated not in the region of the radial sealing surface 40, but within the riser domes 36 where it has no negative impact on the sealing action. In order to better control the flow, during the injection molding process, the axial ends 38 of the recesses for the riser domes 36 are provided with sensors 62 that detect the arrival of the material of the second component 60 into the riser domes 36. This assures the complete filling of the region of the radial seal 28 with the radial sealing surface 40.

The injection mold, which is not shown in detail, is embodied as a mold without gate valves and preferably has a mold parting line that is situated in the diagonal of the essentially rectangular radial seal 28. As a result, any small pieces of flash produced at the mold parting line occur at the rounded corners 30. But at these corners, increased radial forces 32 occur during insertion of the housing part 10 into the radial wall of the housing so that slight irregularities in this region do not negatively affect the sealing action.

In connection with the exemplary embodiment shown in the drawings and discussed in the specification, it should be noted that there are many possible combinations of the individual defining characteristics. It is thus possible, for example, to adapt the concrete form and the cross section of the radial seal 28 to the corresponding uses. It is likewise possible to vary the number and arrangement of riser domes 36, gating points 42, and axial play compensation elements 48. In addition, the form or function of the housing part 10 is not limited to the exemplary embodiment and can, for example, also be used for simple plug elements or for cover elements 14 without electrical contacts 22. Preferably, the housing part 10 according to the present invention is used for drive units in motor vehicles, for example for electronic modules of power window or power sunroof drive units.

What is claimed is:

1. A housing part for a drive unit, comprising a first component having an axial direction and a radial direction, said first component having a wall that is circumferentially closed and insertable into a housing in the axial direction; a radial seal made of an elastomer that is formed onto said wall for sealing the housing in the radial direction perpendicular to the axial direction and said radial seal having first and second sealing lips, said sealing lips circumferentially surrounding said wall and formed outside so as to be located between said wall and the housing in a radial direction, said sealing lips having radial sealing surfaces for sealing the housing in a watertight fashion, wherein said first component and said radial seal are injection molded, wherein at least one riser dome is formed on said radial seal that extends from said radial sealing surface in the axial direction radially inside said radial sealing surface, and forms a fusion seam of two parts of said radial seal, the radial seal having one gating member inside the radial sealing surface, and two connecting pieces extending from said gating member and located inside said wall.

2. A housing part for a drive unit as defined in claim 1, wherein said radial seal has at least one second riser dome, so that said riser domes are situated radially inside said radial sealing surface.

3. A housing part for a drive unit as defined in claim 1, wherein said radial sealing surface has no fusion seam.

4. A housing part for a drive unit as defined in claim 1, wherein said radial seal is substantially rectangular in order to seal an essentially rectangular opening in the housing.

5. A housing part for a drive unit as defined in claim 1, further comprising said two connecting pieces extending from said gating member to a middle of long sides of said radial seal which is substantially rectangular, and two riser domes situated substantially in a middle of its short sides.

6. A housing part for a drive unit as defined in claim 5, further comprising detent elements and attachable to corresponding counter part detent elements for fixing said housing part in place axially, wherein said riser domes are configured in form of axial play compensation elements equipped with an axial stop surface.

* * * * *